United States Patent
Kim et al.

(10) Patent No.: US 11,101,963 B2
(45) Date of Patent: Aug. 24, 2021

(54) METHOD FOR ACK/NACK TRANSMISSION AND RECEPTION IN WIRELESS COMMUNICATION SYSTEM AND APPARATUS THEREFOR

(71) Applicant: LG Electronics Inc., Seoul (KR)

(72) Inventors: Youngtae Kim, Seoul (KR); Hanbyul Seo, Seoul (KR); Sungyong Kang, Seoul (KR); Heejin Kim, Seoul (KR); Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/493,840

(22) PCT Filed: Mar. 15, 2018

(86) PCT No.: PCT/KR2018/003052
§ 371 (c)(1),
(2) Date: Sep. 13, 2019

(87) PCT Pub. No.: WO2018/169327
PCT Pub. Date: Sep. 20, 2018

(65) Prior Publication Data
US 2020/0127793 A1    Apr. 23, 2020

Related U.S. Application Data

(60) Provisional application No. 62/471,982, filed on Mar. 16, 2017.

(51) Int. Cl.
*H04L 5/00* (2006.01)
*H04W 4/44* (2018.01)
(Continued)

(52) U.S. Cl.
CPC .......... *H04L 5/0055* (2013.01); *H04L 1/1854* (2013.01); *H04W 4/44* (2018.02); *H04W 28/04* (2013.01); *H04W 76/28* (2018.02)

(58) Field of Classification Search
None
See application file for complete search history.

(56) References Cited

U.S. PATENT DOCUMENTS

2012/0120908 A1* 5/2012 Ahn ...................... H04L 1/1861
370/329
2018/0234980 A1* 8/2018 Li ......................... H04W 72/10
(Continued)

FOREIGN PATENT DOCUMENTS

| KR | 1020160065878 A | 6/2016 |
|---|---|---|
| KR | 1020160131740 A | 11/2016 |
| WO | 2013073918 A1 | 5/2013 |

OTHER PUBLICATIONS

ZTE, ZTE Microelectronics, "Discussion on duplexing flexibility and cross-link interference mitigation schemes", 3GPP TSG RAN WG1 Meeting #88, Feb. 13-17, 2017, R1-1701616.
(Continued)

*Primary Examiner* — Saumit Shah
(74) *Attorney, Agent, or Firm* — Dentons US LLP

(57) ABSTRACT

The present invention relates to a method and apparatus for transmitting and receiving an acknowledgement/negative-acknowledgement (ACK/NACK) by a terminal for vehicle-to-everything (V2X) communication in a wireless communication system. Particularly, the method comprises the steps of: receiving a configuration for a resource pool for V2X communication; for a particular wireless resource in a resource pool, when a reception time point of a first ACK/NACK and a transmission time of a second ACK/NACK have been simultaneously configured, determining a use of the particular wireless resource; and transmitting and receiv-
(Continued)

ing one ACK/NACK selected from the first ACK/NACK and the second ACK/NACK, on the basis of the use of the particular wireless resource. The UE is capable of communicating with at least one of another UE, a UE related to an autonomous driving vehicle, a base station or a network.

7 Claims, 10 Drawing Sheets

(51) Int. Cl.
*H04W 76/28* (2018.01)
*H04L 1/18* (2006.01)
*H04W 28/04* (2009.01)

(56) References Cited

U.S. PATENT DOCUMENTS

| | | | |
|---|---|---|---|
| 2018/0255532 A1* | 9/2018 | Li | H04L 5/0055 |
| 2019/0159237 A1* | 5/2019 | Wei | H04W 4/40 |
| 2019/0327030 A1* | 10/2019 | Yoshimoto | H04L 1/1858 |
| 2020/0120663 A1* | 4/2020 | Parkvall | H04L 1/1893 |

OTHER PUBLICATIONS

LG Electronics, "Discussion on HARQ timing and process for NR", 3GPP TSG RAN WG1 Meeting #88, Feb. 13-17, 2017, R1-1702487.
Sharp, "HARQ-ACK feedback collision handling for 1ms TTI with shortened processing time", 3GPP TSG RAN WG1 Meeting #88, Feb. 13-17, 2017, R1-1703233.
MediaTek Inc., "Remaining Issues of Low Cost HD-FDD MTC Operation", 3GPP TSG-RAN WG1 #77, May 19-23, 2014, T1-142297.
Ericsson, "Subframe timing conflict in half-duplex FDD", 3GPP TSG-RAN WG1 Meeting #77, May 19-23, 2014, R1-142374.
NEC, "Resource pool design for V2X", 3GPP TSG RAN WG1 Meeting #86, Aug. 22-26, 2016, R1-166645.
Samsung, "Discussion on vehicular communications for NR", 3GPP TSG RAN WG1 #88, Feb. 13-17, 2017, R1-1703021.
MediaTek Inc., "Remaining Issues of Low Cost HD-FDD MTC Operation", 3GPP TSG-RAN WG1 #77, May 19-23, 2014, R1-142297.

* cited by examiner (a) Control-plane protocol stack (b) User-plane protocol stack (a)

(b)

METHOD FOR ACK/NACK TRANSMISSION AND RECEPTION IN WIRELESS COMMUNICATION SYSTEM AND APPARATUS THEREFOR

This application is a National Stage Entry of International Application No. PCT/KR2018/003052 filed Mar. 15, 2018, which claims the benefit of U.S. Provisional Application No. 62/471,982 filed Mar. 16, 2017, all of which are hereby incorporated by reference in their entirety for all purposes as if fully set forth herein.

TECHNICAL FIELD

The present disclosure relates to a wireless communication system, and more particularly, to a method of transmitting and receiving an acknowledgement/negative-acknowledgement (ACK/NACK) and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the above discussion, the present disclosure proposes a method of transmitting and receiving an ACK/NACK in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present disclosure, provided herein is a method of transmitting and receiving, by a user equipment (UE), an acknowledgment/negative-acknowledgment (ACK/NACK) for vehicle-to-everything (V2X) communication in a wireless communication system. The method may include: receiving a configuration of a resource pool for the V2X communication; if regarding a specific radio resource in the resource pool, a reception time of a first ACK/NACK is set equal to a transmission time of a second ACK/NACK, determining usage of the specific radio resource; and transmitting or receiving one ACK/NACK selected from among the first and second ACKs/NACKs according to the usage of the specific radio resource.

Determining the usage of the specific radio resource may include comparing a message priority of first data related to the first ACK/NACK and a message priority of second data related to the second ACK/NACK and determining that the radio resource is for an ACK/NACK related to data with a higher message priority.

When it is determined that the radio resource is for the first ACK/NACK related to the first data, transmitting or receiving the ACK/NACK may correspond to receiving the first ACK/NACK and further include determining that a discontinuous transmission (DTX) error occurs in the second ACK/NACK.

When it is determined that the radio resource is for the second ACK/NACK related to the second data, transmitting or receiving the ACK/NACK may correspond to transmitting the second ACK/NACK and further include performing retransmission for the first ACK/NACK.

Determining the usage of the specific radio resource may include: comparing a highest first message priority among first message priorities of at least one piece of first data related to at least one ACK/NACK including the first ACK/NACK to be received on the specific radio resource and a highest second message priority among second message priorities of at least one piece of second data related to at least one ACK/NACK including the second ACK/NACK to be transmitted on the specific radio resource; and determining that the radio resource is for an ACK/NACK related to data with a higher message priority.

If regarding the specific radio resource, the reception time of the first ACK/NACK is set equal to the transmission time of the second ACK/NACK, the method may further include reconfiguring a radio resource for an ACK/NACK in a next period.

If regarding the specific radio resource, the reception time of the first ACK/NACK is set equal to the transmission time of the second ACK/NACK, the method may further include receiving an indication of the radio resource for the ACK/NACK in the next period on a control channel. The radio resource for the ACK/NACK in the next period may correspond to a radio resource for the other ACK/NACK not selected from among the first and second ACKs/NACKs.

If regarding the specific radio resource, the reception time of the first ACK/NACK is set equal to the transmission time of the second ACK/NACK, time hopping may be applied to the radio resource for the ACK/NACK in the next period using an identifier (ID) of the UE.

Determining the usage of the specific radio resource may include determining the usage of the specific radio resource based on a resource size of the first data associated with the first ACK/NACK and a resource size of the second data associated with the second ACK/NACK.

In another aspect of the present disclosure, provided herein is a UE for transmitting and receiving an ACK/NACK for V2X communication in a wireless communication system. The UE may include: a radiofrequency unit; and a processor. The processor may be configured to: receive a configuration of a resource pool for the V2X communication; if regarding a specific radio resource in the resource pool, a reception time of a first ACK/NACK is set equal to a transmission time of a second ACK/NACK, determine usage of the specific radio resource; and transmit or receive one ACK/NACK selected from among the first and second ACKs/NACKs according to the usage of the specific radio resource.

Advantageous Effects

According to the present disclosure, an ACK/NACK signal can be efficiently transmitted and received in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts 01-DMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
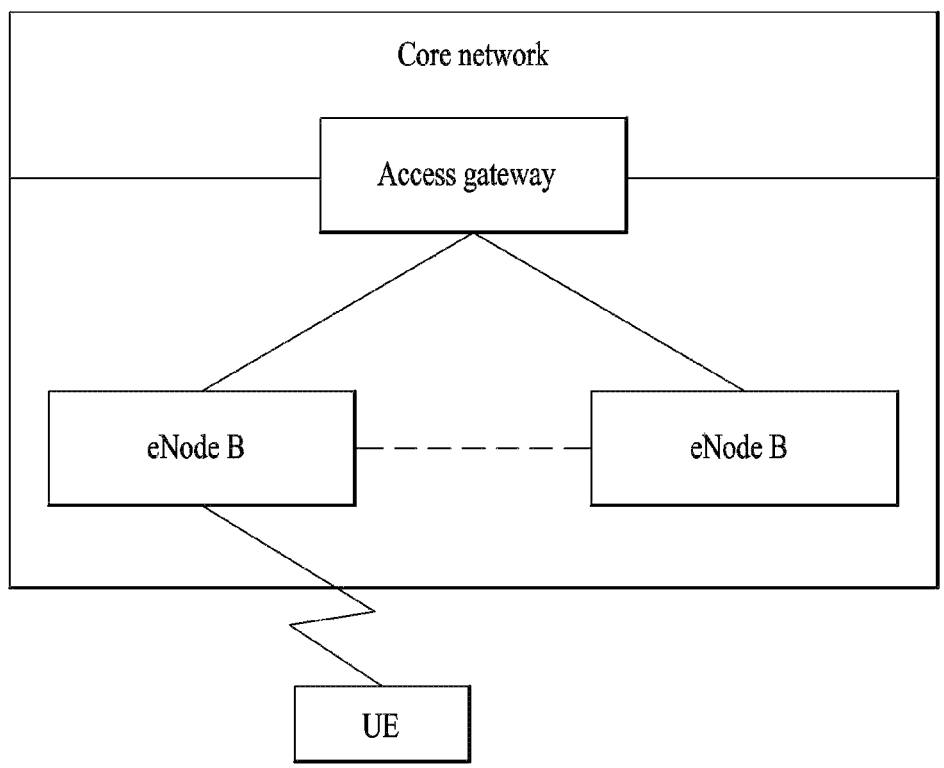
FIG. 1 schematically illustrates an E-UMTS network structure as an example of a wireless communication system.
Figure 2:
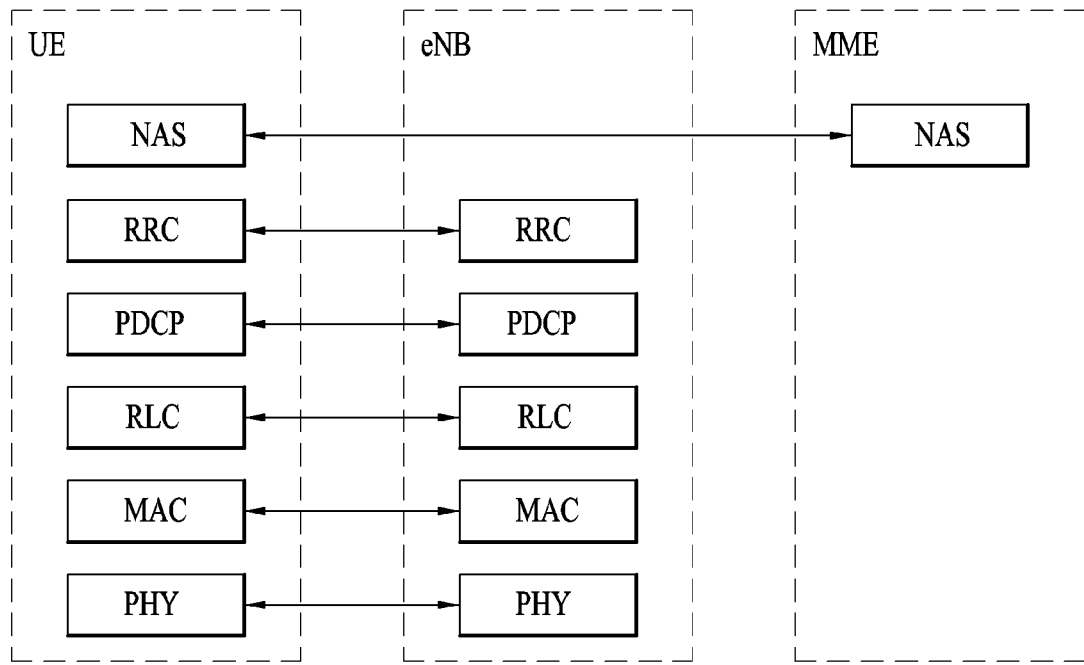
FIG. 2 illustrates control plane and user plane structures of a radio interface protocol between a UE and an E-UTRAN on the basis of the 3GPP wireless access network standard.
Figure 2:
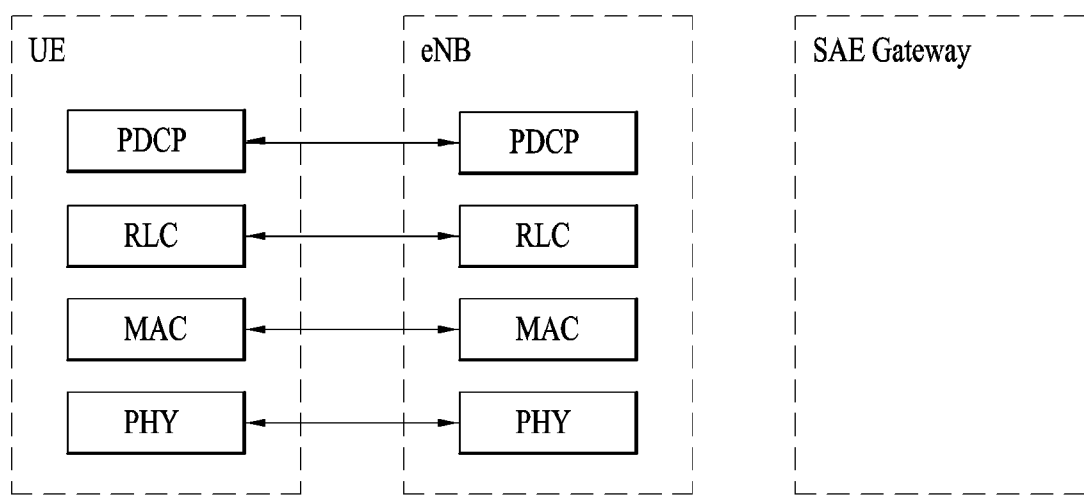

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
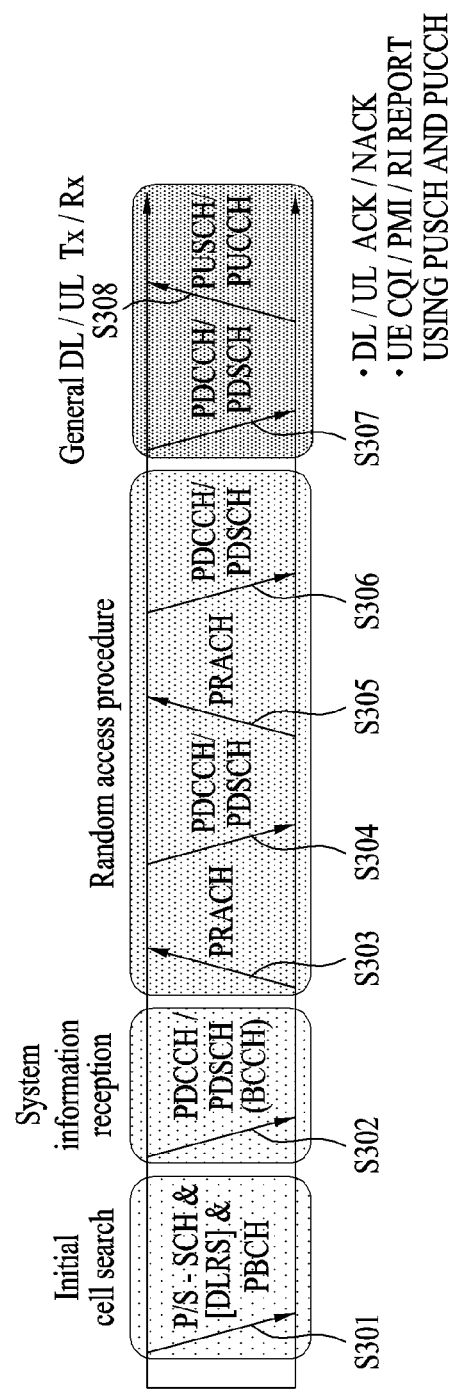
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
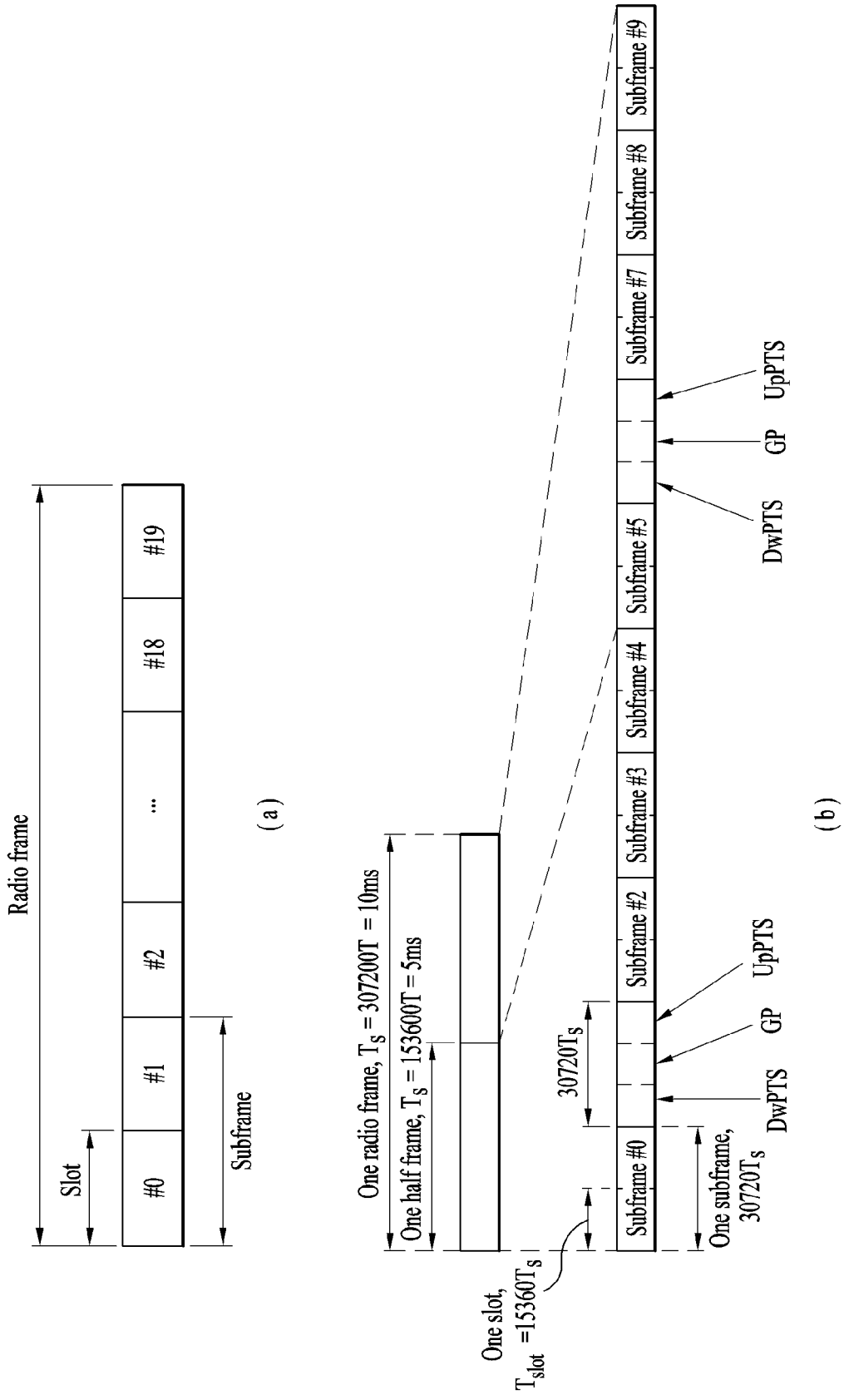
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other O1-DM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
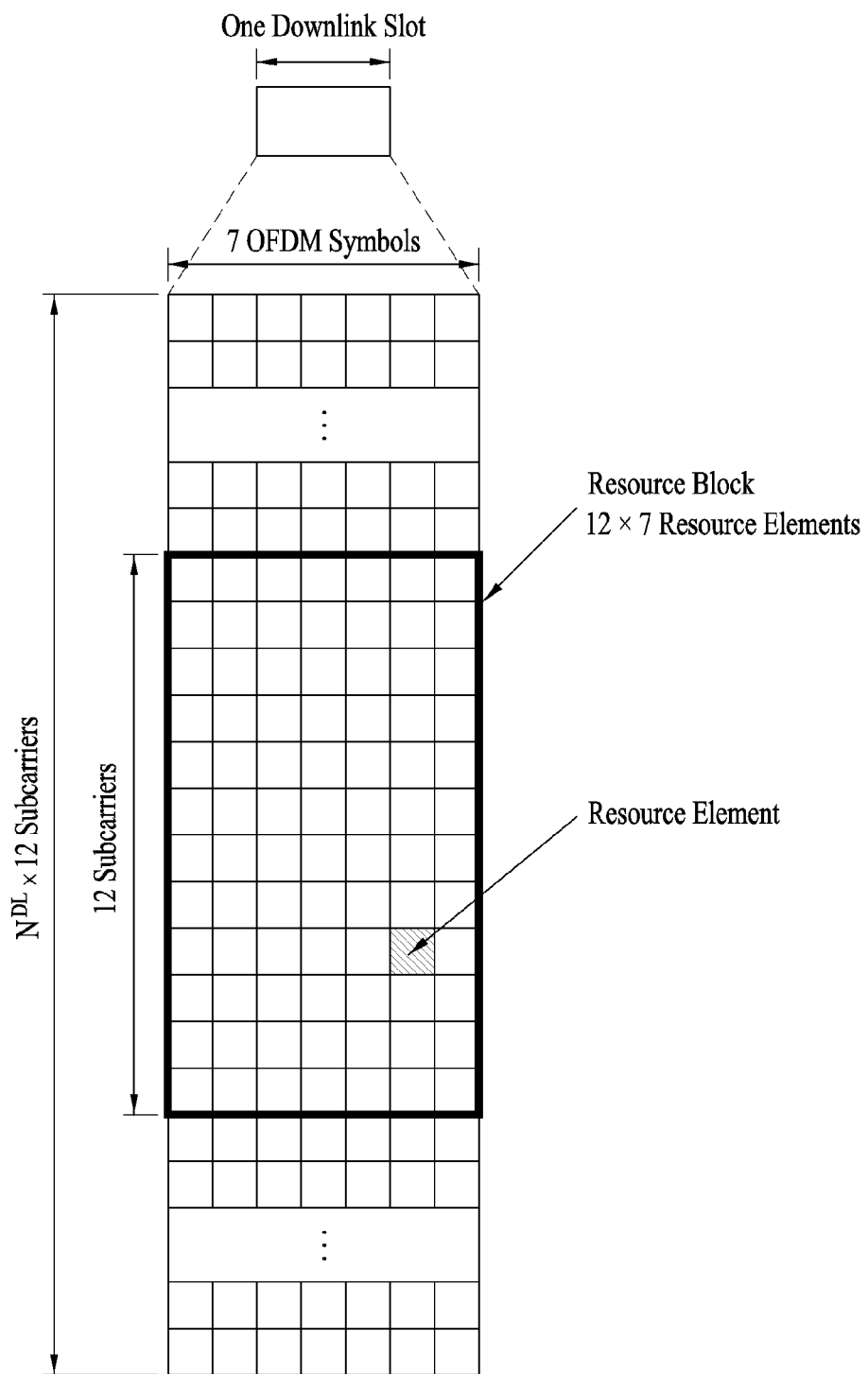
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of resource blocks included in the DL slot depends on a DL transmission bandwidth configured in a cell.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 6:
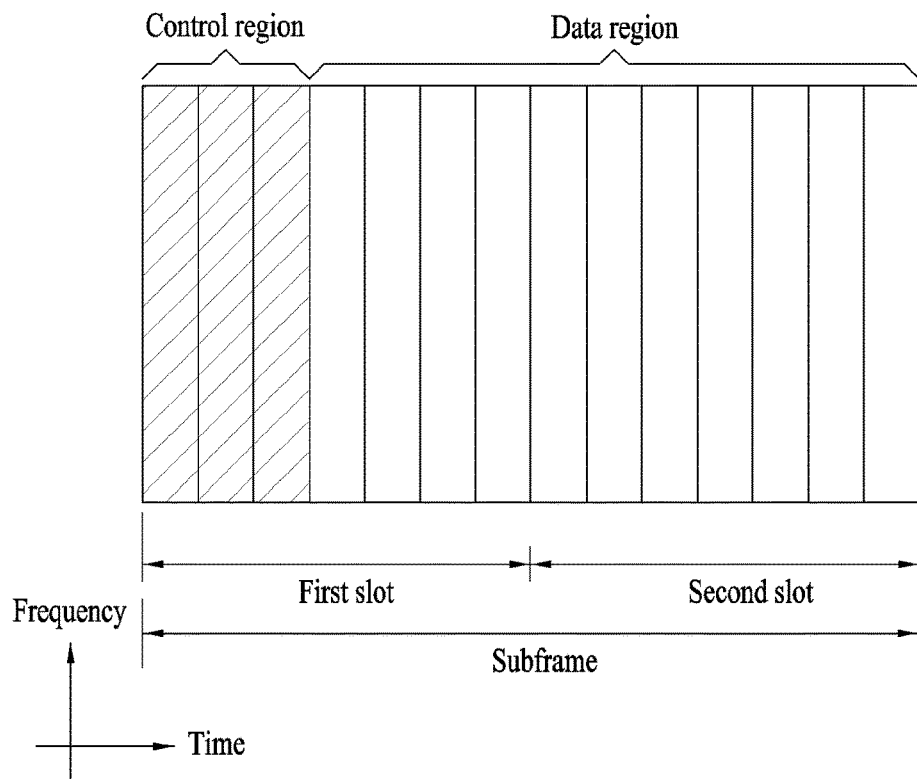
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
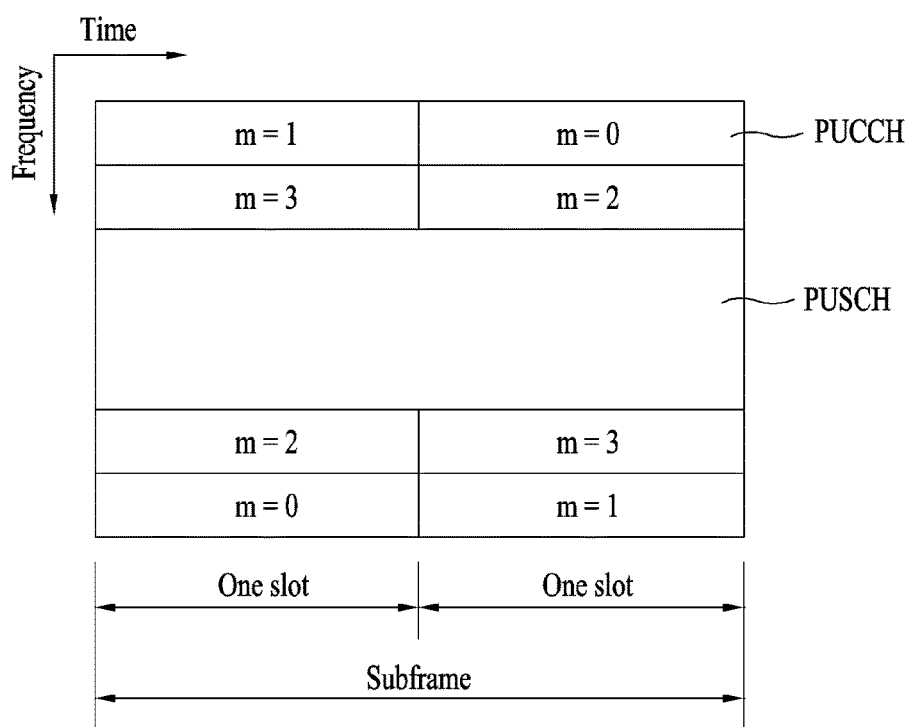
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Figure 8:
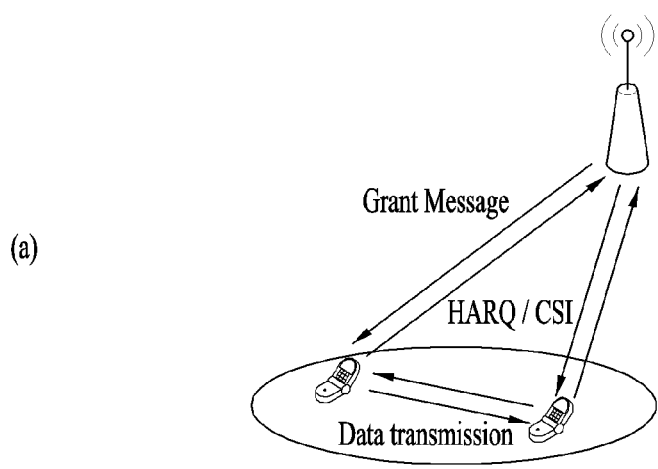
FIG. 8 is a reference diagram to describe D2D (UE-to-UE) communication.
Figure 8:
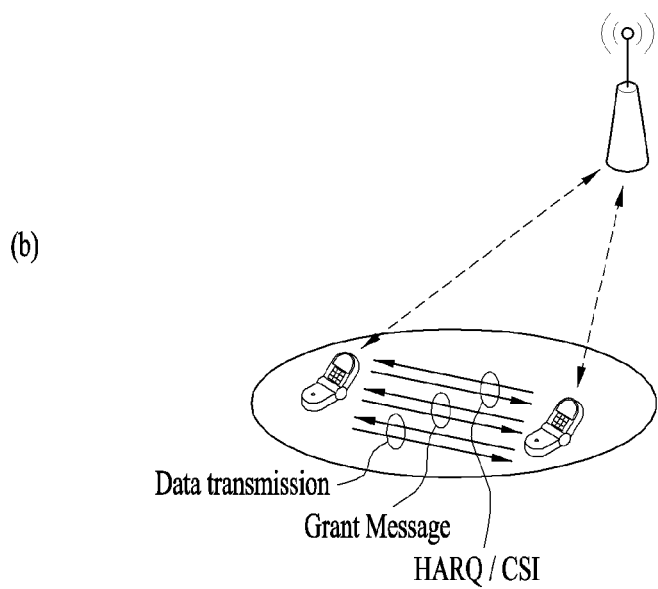

Referring to FIG. 8, FIG. 8 (*a*) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (*b*) illustrates a scheme in which the network provides minimum information (e.g., D2D connection information available in a corresponding cell) only but the user equipments that perform D2D communication establish links to transmit and receive data.

Figure 9:
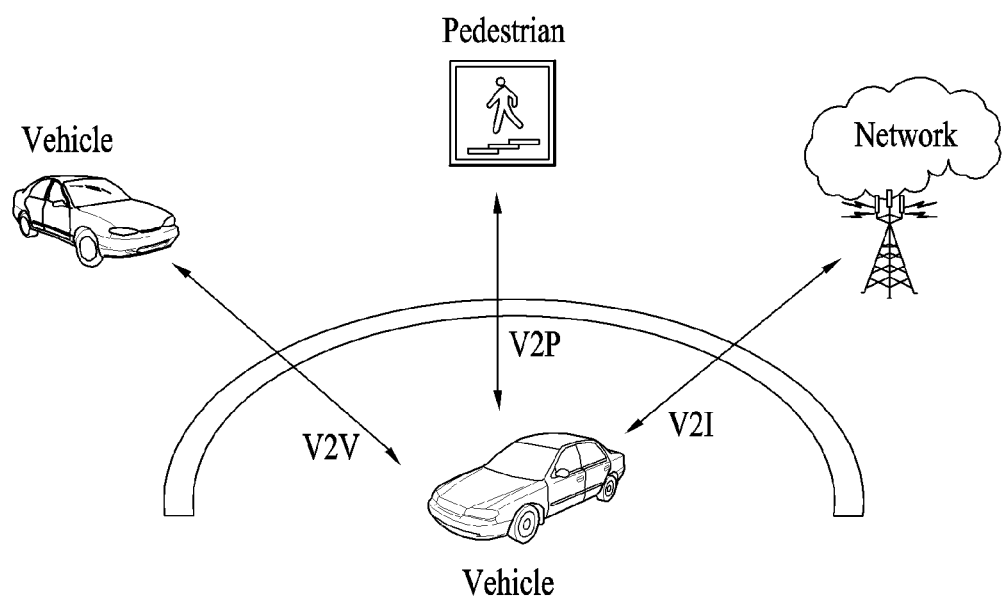
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I)

communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
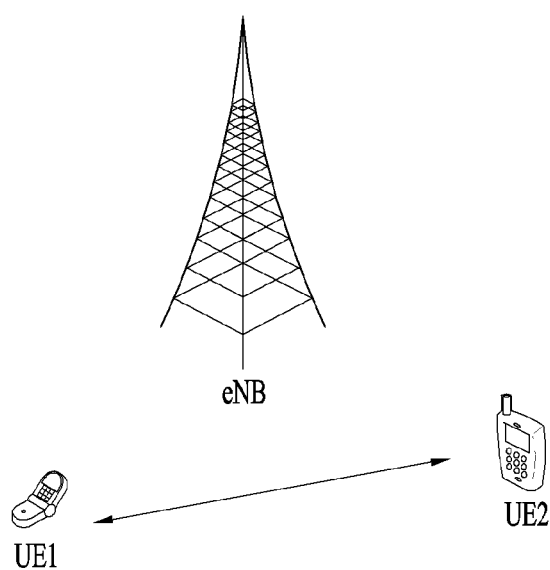
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
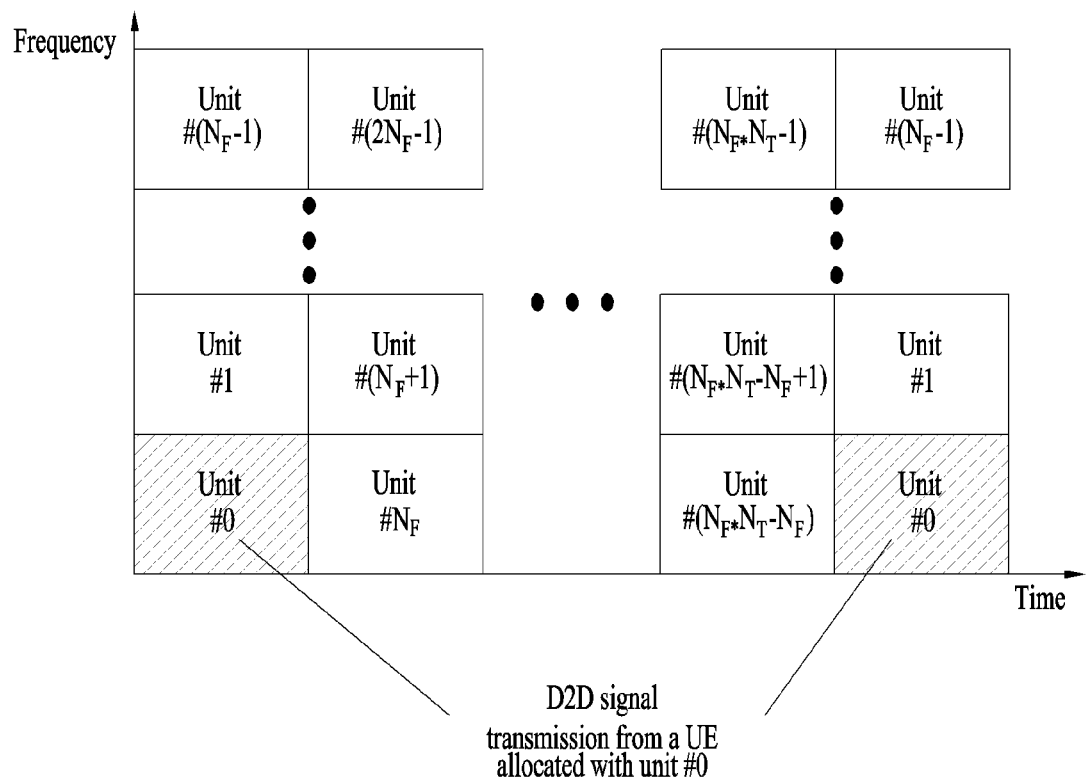

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and then determines whether to become a synchronization source by measuring RSRP of this signal and the like.

It is expected that control and data channels coexist in V2X communication. It is assumed that when control and data channels are associated with each other, multiple vehicles transmit periodic messages. Assuming that a vehicle is a UE, the UE may know the resource locations of currently transmitted messages by decoding the control channel or performing energy sensing on the data channel. In addition, the UE may know even the resource locations to be used by other transmitting UEs.

Based on the above-described technical features, the present disclosure describes a method of using a hybrid automatic repeat request (HARQ) acknowledgement/negative-acknowledgement (ACK/NACK) resource when broadcast transmission is performed in V2X communication. Specifically, the present disclosure proposes a method of solving a half-duplex problem related to ACK/NACK resources.

In broadcast transmission, the design of ACK/NACK resources becomes important particularly when it operates based on a HARQ ACK/NACK. If an ACK/NACK resource is frequency division multiplexed (FDM) with a data resource, the half-duplex problem may occur between the data and ACK/NACK resources.

In other words, data may not be received when an ACK/NACK is transmitted, or an ACK/NACK may not be received when data is transmitted. Considering that when data and ACK/NACK resources are selected, the currently occupied data and ACK/NACK resources should be considered, it is difficult to solve such a problem systemically.

To prevent the occurrence of the half-duplex problem, the following method may be applied. That is, assuming an ACK/NACK resource is allocated at a specific time and sensing is performed in a similar way as in LTE Rel-14, the problem may be somewhat mitigated. In particular, if all ACK/NACK transmission timings and all data resources are spaced at the same interval (e.g., 4 ms) because there is no latency issue, each ACK/NACK transmission is performed after the same length of time after data is selected. Thus, solving the half-duplex problem in terms of data transmission may naturally solve the half-duplex problem in terms of ACK/NACK transmission.

However, if there is a latency issue, the half-duplex problem may still be present in the ACK/NACK transmission even though a data resource is selected by considering the half-duplex problem after sensing. This is because if each data transmission has a different ACK/NACK timing due to different latency, data and ACK/NACK resources should be selected together.

To mitigate such a problem, a method of directly indicating an ACK/NACK timing using a control channel may be considered. However, if the timing of an ACK/NACK transmission is indicated to be close to that of a data transmission due to short latency, the half-duplex problem may not be solved. That is, an ACK/NACK resource needs to be compulsorily selected according to the latency.

Although the present disclosure is described based on broadcast transmission, it is apparent that the disclosure is applicable to unicast or groupcast transmission.

Hereinafter, a description will be given of how a UE operates when the UE should receive an ACK/NACK at the timing when the UE needs to transmit another ACK/NACK.

First Embodiment

According to the first embodiment of the present disclosure, if a UE should receive an ACK/NACK when the UE needs to transmit another ACK/NACK, the UE may transmit the latter ACK/NACK and retransmit a message related to the ACK/NACK that the UE should receive unconditionally regardless of ACK/NACK response. In other words, a transmitting UE may perform ACK/NACK transmission instead of performing ACK/NACK reception and then enable an ACK/NACK that the UE should receive to be unconditionally retransmitted, thereby solving the half-duplex problem related to ACK/NACK transmission and reception.

Second Embodiment

According to the second embodiment of the present disclosure, if a UE should receive an ACK/NACK when the UE needs to transmit another ACK/NACK, the UE may determine whether to perform ACK/NACK transmission or ACK/NACK reception based on the resource sizes of data transmissions related to the ACK/NACK transmission and reception.

According to the second embodiment, whether the ACK/NACK transmission or ACK/NACK reception is performed may be determined depending on which one has a larger data transmission resource size.

For example, if the resource size of a data transmission related to the ACK/NACK that the UE should receive is greater than that related to the ACK/NACK that the UE should transmit, the UE performs the ACK/NACK reception. In this case, since the UE does not transmit the ACK/NACK that the UE should transmit, it is regarded as a discontinuous transmission (DTX) error, and as a result, retransmission may be performed.

On the contrary, if the resource size of the data transmission related to the ACK/NACK that the UE should receive is smaller than that related to the ACK/NACK that the UE should transmit, the UE performs the ACK/NACK transmission. In this case, since the UE does not receive the ACK/NACK, the ACK/NACK that the UE does not receive may be unconditionally retransmitted.

Accordingly, when either the ACK/NACK reception or ACK/NACK transmission is selected, a data transmission related to the selected one may be retransmitted. In other words, from the perspective of reducing a resource size for retransmission, the UE may receive or transmit an ACK/NACK related to a data transmission having a larger resource size.

In addition, according to the second embodiment, whether the ACK/NACK transmission or ACK/NACK reception is performed may be determined by comparing the sum of resource sizes of data transmissions related to the ACK/NACK transmission and the sum of resource sizes of data transmissions related to the ACK/NACK reception.

For example, if the sum of resource sizes of data transmissions related to ACKs/NACKs that the UE should receive at a specific timing is greater than that related to ACKs/NACKs that the UE should transmit at the specific timing, the UE receives all ACKs/NACKs that the UE should receive. In this case, since the UE does not transmit the ACKs/NACKs that the UE should transmit, it is regarded as a DTX error, and as a result, retransmission may be performed.

On the contrary, if the sum of the resource sizes of the data transmissions related to the ACKs/NACKs that the UE should receive at the specific timing is smaller than that related to the ACKs/NACKs that the UE should transmit at the specific timing, the UE transmits all ACKs/NACKs that the UE should transmit. In this case, since the UE does not receive the ACKs/NACKs, the ACKs/NACKs that the UE does not receive may be unconditionally retransmitted.

Accordingly, when either the ACK/NACK reception or ACK/NACK transmission is selected, data transmissions related to the selected one may be retransmitted. In other words, from the perspective of reducing resource sizes for retransmission, the UE may receive or transmit ACKs/NACKs related to data transmissions of which the sum of resource sizes is large.

Third Embodiment

According to the third embodiment of the present disclosure, if a UE should receive an ACK/NACK when the UE needs to transmit another ACK/NACK, the UE may determine whether to perform ACK/NACK transmission or ACK/NACK reception based on the message priorities of data transmissions related to the ACK/NACK transmission and reception.

According to the third embodiment, whether the ACK/NACK transmission or ACK/NACK reception is performed may be determined depending on which one has a higher data transmission message priority. For example, if the message priority of a data transmission related to the ACK/NACK that the UE should receive is higher than that related to the ACK/NACK that the UE should transmit, the UE performs the ACK/NACK reception. In this case, since the UE does not transmit the ACK/NACK that the UE should transmit, it is regarded as a DTX error, and as a result, retransmission may be performed.

On the contrary, if the message priority of the data transmission related to the ACK/NACK that the UE should receive is lower than that related to the ACK/NACK that the UE should transmit, the UE performs the ACK/NACK transmission. In this case, since the UE does not receive the ACK/NACK, the ACK/NACK that the UE does not receive may be unconditionally retransmitted as described in the first embodiment.

That is, by performing either the ACK/NACK transmission or ACK/NACK reception by prioritizing the data transmission with a higher message priority, the UE may prevent the data transmission with the higher message priority from being unnecessarily retransmitted. This is because when the data transmission with the higher message priority is transmitted multiple times regardless of ACKs/NACKs, it is necessary to prevent that unnecessary operation is performed by another transmission to protect the data transmission.

In addition, according to the third embodiment, whether the ACK/NACK transmission or ACK/NACK reception is performed may be determined depending on which one has a lower data transmission message priority.

For example, if the message priority of the data transmission related to the ACK/NACK that the UE should receive is lower than that related to the ACK/NACK that the UE should transmit, the UE performs the ACK/NACK reception. In this case, since the UE does not transmit the ACK/NACK that the UE should transmit, it is regarded as a DTX error, and as a result, retransmission may be performed.

On the contrary, if the message priority of the data transmission related to the ACK/NACK that the UE should receive is higher than that related to the ACK/NACK that the UE should transmit, the UE performs the ACK/NACK transmission. In this case, since the UE does not receive the ACK/NACK, the ACK/NACK that the UE does not receive may be unconditionally retransmitted as described in the first embodiment.

That is, by performing either the ACK/NACK transmission or ACK/NACK reception by prioritizing the data transmission with a lower message priority, the UE may allow the data transmission with a higher message priority to be retransmitted regardless of ACKs/NACKs. By doing so, the probability of retransmitting the data transmission with the higher message priority may increase, that is, the probability of not retransmitting the data transmission with the higher message priority due to a NACK-to-ACK error may decrease, thereby improving reliability.

Moreover, according to the third embodiment, whether the ACK/NACK transmission or ACK/NACK reception is performed may be determined as follows. First, the UE compares the highest message priority among message priorities of data transmissions related to the ACK/NACK transmission and the highest message priority among message priorities of data transmissions related to the ACK/NACK reception. Then, if the former is higher than the latter, the UE perform the ACK/NACK transmission. On the contrary, if the former is lower than the latter, the UE performs the ACK/NACK reception.

For example, if the highest message priority among message priorities of the data transmissions related to ACKs/

NACKs that the UE should receive is higher than that related to ACKs/NACKs that the UE should transmit, the UE receives all ACKs/NACKs that the UE should receive. In this case, since the UE does not transmit the ACKs/NACKs that the UE should transmit, it is regarded as a DTX error, and as a result, retransmission may be performed.

On the contrary, if the highest message priority among the message priorities of the data transmissions related to ACKs/NACKs that the UE should receive is lower than that related to ACKs/NACKs that the UE should transmit, the UE transmits all ACKs/NACKs that the UE should transmit. In this case, since the UE does not receive the ACKs/NACKs, the ACKs/NACKs that the UE does not receive may be unconditionally retransmitted as described in the first embodiment.

Accordingly, by performing either the ACK/NACK transmission or ACK/NACK reception by prioritizing the data transmission with the highest message priority, the UE may prevent the data transmission with the highest message priority from being unnecessarily retransmitted. This is because when the data transmission with the highest message priority is transmitted multiple times regardless of ACKs/NACKs, it is necessary to prevent that unnecessary operation is performed by another transmission to protect the data transmission.

Further, according to the third embodiment of the present disclosure, whether the ACK/NACK transmission or ACK/NACK reception is performed may be determined as follows. First, the UE compares the highest message priority among the message priorities of the data transmissions related to the ACK/NACK transmission and the highest message priority among the message priorities of the data transmissions related to the ACK/NACK reception. Then, if the former is lower than the latter, the UE perform the ACK/NACK transmission. On the contrary, if the former is higher than the latter, the UE performs the ACK/NACK reception.

For example, if the highest message priority among the message priorities of the data transmissions related to the ACKs/NACKs that the UE should receive is lower than that related to the ACKs/NACKs that the UE should transmit, the UE receives all ACKs/NACKs that the UE should receive. In this case, since the UE does not transmit the ACKs/NACKs that the UE should transmit, it is regarded as a DTX error, and as a result, retransmission may be performed.

On the contrary, if the highest message priority among the message priorities of the data transmissions related to the ACKs/NACKs that the UE should receive is higher than that related to the ACKs/NACKs that the UE should transmit, the UE transmits all ACKs/NACKs that the UE should transmit. In this case, since the UE does not receive the ACKs/NACKs, the ACKs/NACKs that the UE does not receive may be unconditionally retransmitted as described in the first embodiment.

That is, by not performing either the ACK/NACK transmission or ACK/NACK reception for the data transmission with the highest message priority, the UE may allow the data transmission with the higher message priority to be retransmitted regardless of ACKs/NACKs. By doing so, the probability of retransmitting the data transmission with the higher message priority may increase, that is, the probability of not retransmitting the data transmission with the higher message priority due to a NACK-to-ACK error may decrease, thereby improving reliability.

Further, the present disclosure can be applied by combining at least one of the first to third embodiments. Additionally, an eNB may select the at least one of the first to third embodiments and inform UEs of the selected embodiments through RRC signaling.

Fourth Embodiment

In the following, the present disclosure will be described by assuming that transmission is periodically performed.

Basically, assuming that a UE periodically performs transmission, if the UE should simultaneously perform ACK/NACK transmission and ACK/NACK reception during initial transmission, it is desirable that the UE attempts to avoid a situation in which the UE should simultaneously perform ACK/NACK transmission and ACK/NACK reception in next transmission.

According to the fourth embodiment, if a UE should receive an ACK/NACK when the UE needs to transmit another ACK/NACK, the UE may reselect data and ACK/NACK resources in next transmission.

If the UE performs this operation together with sensing, the UE may select data and ACK/NACK resources more suitable than those for the current transmission. Therefore, the half-duplex problem may be further mitigated.

In summary, when data transmission is periodically performed, if the half-duplex problem occurs regarding an ACK/NACK independently from reselection, data and ACK/NACK resources may be re-selected.

Fifth Embodiment

According to the fifth embodiment, when a UE should receive an ACK/NACK when the UE needs to transmit another ACK/NACK, if an ACK/NACK resource is indicated by a control channel, the UE may not maintain the time interval between data and ACK/NACK resources in the previous transmission during the current transmission. For example, assuming that the UE transmits an ACK/NACK after 4 ms after transmitting data in the previous period, the UE should transmit another ACK/NACK by avoiding an ACK/NACK resource after 4 ms after transmitting data in the current period. This may be interpreted to mean that the UE adjusts ACK/NACK resources in the time domain to solve the half-duplex problem in the previous ACK/NACK transmission.

If there is no choice but to select an ACK/NACK resource having the half-duplex problem even though it is indicated that the ACK/NACK resource having the half-duplex problem is to be avoid, it may be designed that the previous data transmission resource and ACK/NACK timing are indicated without the reselection. The reason for this is that when the ACK/NACK resource is indicated by the control channel, the time interval between the data and ACK/NACK resources in the previous transmission can be designed to be maintained, that is, not to be changed. In this case, even though the ACK/NACK timing is modified to solve the half-duplex problem, the half-duplex problem regarding the ACK/NACK transmission may still be present. As a result, the reselection of the data and ACK/NACK resources may become meaningless.

Sixth Embodiment

According to the sixth embodiment, when a UE should receive an ACK/NACK when the UE needs to transmit another ACK/NACK, if the relative time interval between data and ACK/NACK resources is fixed, the UE may perform time hopping between ACK/NACK resources in each period.

In this case, the time hopping may be performed between time-domain ACK/NACK resources adjacent to the ACK/NACK resource used in the previous period. The set of the ACK/NACK resources where the time hopping is performed may be predefined or indicated by an eNB through RRC signaling.

The object of the time hopping between the ACK/NACK resources is to solve the half-duplex problem in ACK/NACK timings between UEs, and thus, a time hopping configuration needs to be configured UE-specifically. Thus, a UE ID may be used for the time hopping configuration.

Figure 12:
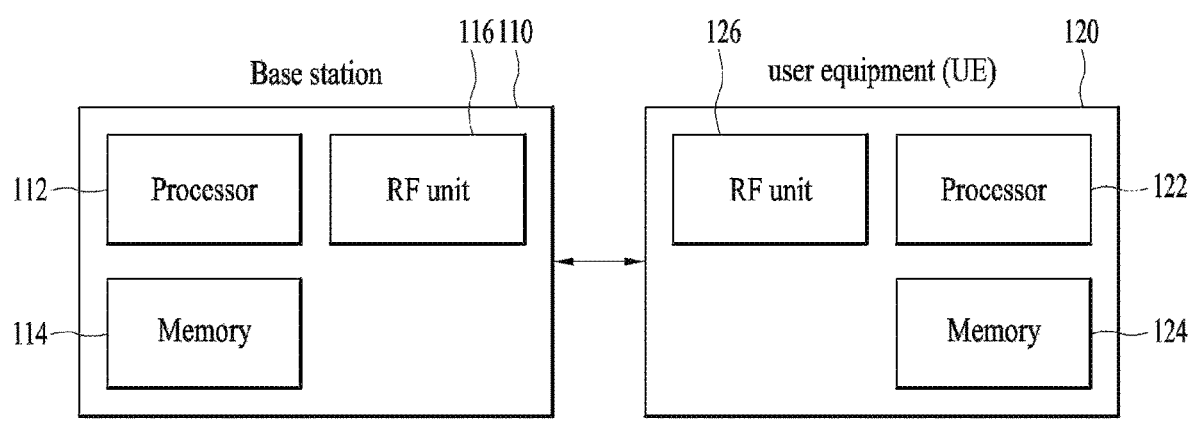
FIG. 12 shows a base station and a user equipment applicable to one embodiment of the present invention.

FIG. 12 illustrates a base station (BS) and a user equipment (UE) applicable to an embodiment of the present invention.

If a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of transmitting and receiving ACK/NACK in a wireless communication system and apparatus therefor can be applied to various wireless communication systems.

The invention claimed is:

1. A method for a user equipment (UE) operating in a wireless communication system, the method comprising:
   determining whether to perform a transmission of a first sidelink feedback or a reception of a second sidelink feedback based on the transmission of the first sidelink feedback overlapping in time with the reception of the second sidelink feedback; and
   transmitting the first sidelink feedback or receiving the second sidelink feedback corresponding to a highest priority based on the determination whether to perform a transmission of a first sidelink feedback or a reception of a second sidelink feedback,
   wherein the highest priority is determined among a first message priority related to the first sidelink feedback and a second message priority related to the second sidelink feedback.

2. The method of claim 1,
   wherein when it is determined to perform the transmission of the first sidelink feedback, transmitting the first sidelink feedback, and
   wherein the method further comprises determining that a discontinuous transmission (DTX) error occurs in the second sidelink feedback.

3. The method of claim 1,
wherein when it is determined to perform the reception of the second sidelink feedback, receiving the second sidelink feedback, and
wherein the method further comprises performing retransmission for the first sidelink feedback.

4. The method of claim 1,
wherein
the first message priority is related to a plurality of first sidelink feedback including the first sidelink feedback, and
wherein the second message priority is related to a plurality of second sidelink feedback including the second sidelink feedback.

5. A user equipment (UE) operating in a wireless communication system, the UE comprising:
a transceiver; and
a processor operably connected to the transceiver, the processor is configured to:
determine whether to perform a transmission of a first sidelink feedback or a reception of a second sidelink feedback based on the transmission of the first sidelink feedback overlapping in time with the reception of the second sidelink feedback; and
transmit the first sidelink feedback or receive the second sidelink feedback corresponding to a highest priority based on the determination whether to perform a transmission of a first sidelink feedback or a reception of a second sidelink feedback,
wherein the highest priority is determined among a first message priority related to the first sidelink feedback and a second message priority related to the second sidelink feedback.

6. The UE according to claim 5, wherein the UE is capable of communicating with at least one of another UE, a UE related to an autonomous driving vehicle, a base station or a network.

7. The UE according to claim 5,
wherein the first message priority is related to a plurality of first sidelink feedback including the first sidelink feedback, and
wherein the second message priority is related to a plurality of second sidelink feedback including the second sidelink feedback.

* * * * *